United States Patent
Müllenborn et al.

(10) Patent No.: US 7,142,682 B2
(45) Date of Patent: Nov. 28, 2006

(54) SILICON-BASED TRANSDUCER FOR USE IN HEARING INSTRUMENTS AND LISTENING DEVICES

(75) Inventors: Matthias Müllenborn, Lyngby (DK); Aart Z. van Halteren, Hobrede (NL)

(73) Assignee: Sonion Mems A/S, Lyngby (DK)

( * ) Notice: Subject to any disclaimer, the term of this patent is extended or adjusted under 35 U.S.C. 154(b) by 245 days.

(21) Appl. No.: 10/326,208

(22) Filed: Dec. 20, 2002

(65) Prior Publication Data

US 2004/0120540 A1 Jun. 24, 2004

(51) Int. Cl.
*H04R 25/00* (2006.01)

(52) U.S. Cl. .................................. 381/322; 381/324

(58) Field of Classification Search ........ 381/322–324, 381/328, 330, 380–381; 181/129–130
See application file for complete search history.

(56) References Cited

U.S. PATENT DOCUMENTS

| | | | | |
|---|---|---|---|---|
| 4,598,177 A * | 7/1986 | McGroarty et al. | ......... | 381/323 |
| 4,712,245 A | 12/1987 | Lyregaard | .................. | 381/68.6 |
| 4,922,471 A | 5/1990 | Kuehnel | ..................... | 367/181 |
| 5,146,435 A | 9/1992 | Bernstein | ..................... | 367/181 |
| 5,255,246 A | 10/1993 | van Halteren | .............. | 367/170 |
| 5,452,268 A | 9/1995 | Bernstein | ..................... | 367/181 |
| 5,490,220 A | 2/1996 | Loeppert | ..................... | 381/168 |
| 5,531,787 A | 7/1996 | Lesinski et al. | .............. | 623/10 |
| 5,573,679 A | 11/1996 | Mitchell et al. | ................ | 216/2 |
| 5,658,710 A | 8/1997 | Neukermans | ............... | 430/320 |
| 5,659,195 A | 8/1997 | Kaiser et al. | ................ | 257/415 |
| 5,677,965 A | 10/1997 | Moret et al. | ................. | 381/191 |
| 5,717,631 A | 2/1998 | Carley et al. | ............... | 365/174 |
| 5,740,258 A | 4/1998 | Goodwin-Johansson | ..... | 381/72 |
| 5,799,095 A | 8/1998 | Hanright | ..................... | 381/68 |
| 5,870,482 A | 2/1999 | Loeppert et al. | ............ | 381/174 |
| 5,889,874 A * | 3/1999 | Schmitt et al. | ............. | 381/328 |
| 5,915,031 A * | 6/1999 | Hanright | ..................... | 381/323 |
| 5,970,315 A | 10/1999 | Carley et al. | .................. | 438/52 |
| 5,995,636 A | 11/1999 | Tøpholm | ..................... | 381/323 |
| 6,088,463 A | 7/2000 | Rombach et al. | ........... | 381/174 |
| 6,493,453 B1 | 12/2002 | Glendon | ..................... | 381/322 |
| 6,516,074 B1 | 2/2003 | Brimhall et al. | ............. | 381/322 |
| 2001/0036288 A1 * | 11/2001 | Robinson et al. | ........... | 381/323 |
| 2005/0123157 A1 | 6/2005 | Kragelund et al. | |  |

FOREIGN PATENT DOCUMENTS

| | | | |
|---|---|---|---|
| DE | 33 25 961 A | | 1/1985 |
| EP | 0 490 486 A2 | | 6/1992 |

(Continued)

OTHER PUBLICATIONS

International Search Report, Dated Oct. 21, 2004.

(Continued)

*Primary Examiner*—Suhan Ni
(74) *Attorney, Agent, or Firm*—Jenkens & Gilchrist

(57) ABSTRACT

A silicon-based transducer assembly coupled to a movable structure in a hearing instrument. The transducer assembly includes at least one microphone chip and an ASIC having multiple integrated components such as any combination of a DSP, an A/D converter, an amplifier, a filter, or a wireless interface. The movable structure may be a battery access door, a volume dial, a switch, or a touch pad. A protection strip can be disposed across the battery access door to prevent debris from clogging the silicon-based transducer assembly. The transducer assembly may also include an array of microphone chips to achieve adaptive beam steering or directionality. When equipped with a wireless interface, the hearing instrument wirelessly communicates with another hearing instrument or with a network.

43 Claims, 10 Drawing Sheets

FOREIGN PATENT DOCUMENTS

| | | |
|---|---|---|
| EP | 0 561 566 A2 | 9/1993 |
| EP | 0 783 108 A1 | 7/1997 |
| JP | 9037382 A | 2/1997 |
| WO | WO 93/19343 | 9/1993 |
| WO | WO 94/25863 | 11/1994 |
| WO | WO 94/30030 | 12/1994 |
| WO | WO 95/34917 | 12/1995 |
| WO | WO 96/30182 | 10/1996 |
| WO | WO 97/01258 | 1/1997 |
| WO | WO 98/12897 | 3/1998 |
| WO | WO 98/47319 | 10/1998 |
| WO | WO 00/62580 | 10/2000 |
| WO | WO 00/70630 | 11/2000 |
| WO | WO 01/19134 A2 | 3/2001 |
| WO | WO 01/19134 A3 | 3/2001 |
| WO | WO 01/20948 A2 | 3/2001 |
| WO | WO 01/20948 A3 | 3/2001 |
| WO | WO 01/50814 A1 | 7/2001 |
| WO | WO 03/049495 | 6/2003 |

OTHER PUBLICATIONS

Akustica, "The Akustica *AkuSmart Transducers* Product Family" from website, 2 pages (printed from website on Jun. 19, 2002).

Akustica, "CMOS MEMS" from website, 4 pages (printed from website on Jun. 19, 2002).

Akustica, "Hearing Aid System-On-Chip" from website, 10 pages (printed from website on Jun. 19, 2002).

Bay, Jesper, et al., "Design Of A Silicon Microphone With Differential Read-Out Of A Sealed Double Parallel-Plate Capacitor," Sensors and Actuators A, vol. 53, pp. 232-236 (1996).

Bouwstra, Siebe, et al., "Silicon Microphones—A Danish Perspective," J. Micromech. Microeng., vol. 8, pp. 64-68 (1998).

Chowdhury, Sazzadur, et al., "A Surface Mountable MEMS Beamforming Microphone Array And Associated MEMS Socket Structure," Presentation at Symposium on Microelectronics Research & Development, 20 pages (Jun. 7, 2001).

Chowdhury, Sazzadur, et al., "MEMS Acousto-Magnetic Components For Use In A Hearing Instrument," Presentation at SPIE's Symposium on Design, Test, Integration, and Packaging of MEMS/MOEMS, 14 pages (May 9-11, 2000).

Dehé, A., et al., "Silicon Micromachined Microphone Chip At Siemens," 4 pages (no date).

van der Donk, A.G.H., et al., "Preliminary Results Of A Silicon Condenser Microphone With Internal Feedback," IEEE, pp. 262-265 (1991).

Emkay Innovative Products, Brochure for "SiSonic™ Silicon Microphone," 2 pages (no date).

Emkay Innovative Products, "Surface Mount Microphones: A New Options For OEMs," EPN, 2 pages (Jun. 11, 2002).

Emkay Innovative Products, Press Release for "Advancement In Silicon Technology Leads To Partnership With Institute Of Microelectronics—Singapore," 2 pages (Jan. 9, 1998).

Hsu, P.-C, et al., "A High Sensitivity Polysilicon Diaphragm Condenser Microphone," Presentation at MEMS Conference, 6 pages (Jan. 25-29, 1998).

Karoub, Jeff, "MEMS Pioneer Takes A Year Off School To Sell His Wares," Small Times, 3 pages (May 10, 2002).

Klein, Udo, et al., "The Advent Of Silicon Microphones In High-Volume Applications," mstnews, 2 pages (Feb. 2001).

Microtronic, "Silicon Microphone Technical Design Specification—Tentative," 2 pages (Mar. 27, 2001).

Müllenborn, M., et al., "Chip-Size-Packaged Silicon Microphones," Sensors and Actuators A, vol. 92, pp. 23-29 (2001).

Müllenborn, Matthias, "Microsystems For Hearing Instruments," Micro Structure Bulletin, No. 3, 1 page (Aug. 1998).

Müllenborn, M., et al., "Stacked Silicon Microphones," Presentation at Eurosensors XIV, pp. 209-212 (Aug. 27-30, 2000).

Niew, Jeffrey S., "Surface Mount Microphone," Wireless Design & Development, pp. 30-31 (Apr. 2002).

Ouellette, Jennifer, "The Incredible Shrinking Microphone," The Industrial Physicist, 3 pages (Aug. 1999).

Rombach, Pirmin, et al., "The First Low Voltage, Low Noise Differential Silicon Microphone, Technology Development And Measurement Results," Sensors and Actuators A, vol. 95, pp. 196-201 (2002).

Scheeper, P. R., et al., "Fabrication Of Silicon Condenser Microphones Using Single Wafer Technology," Journal Of Microelectromechanical Systems, vol. 1, No. 3, pp. 147-154 (Sep. 1992).

SonionMEMS, Brochure for Silicon Microphone, 4 pages (no date).

SonionMEMS, Brochure for "Competencies And Technologies," 2 pages (no date).

SonionMicrotronic, Application Note for Directionality, 9 pages (Sep. 3, 2002).

Stanacevic, Milutin, et al., "Gradient Flow Adaptive Beamforming And Signal Separation In A Miniature Microphone Array," 4 pages (no date).

Transducers '99, Micro Structure Bulletin, No. 3, 8 pages (Aug. 1999).

* cited by examiner

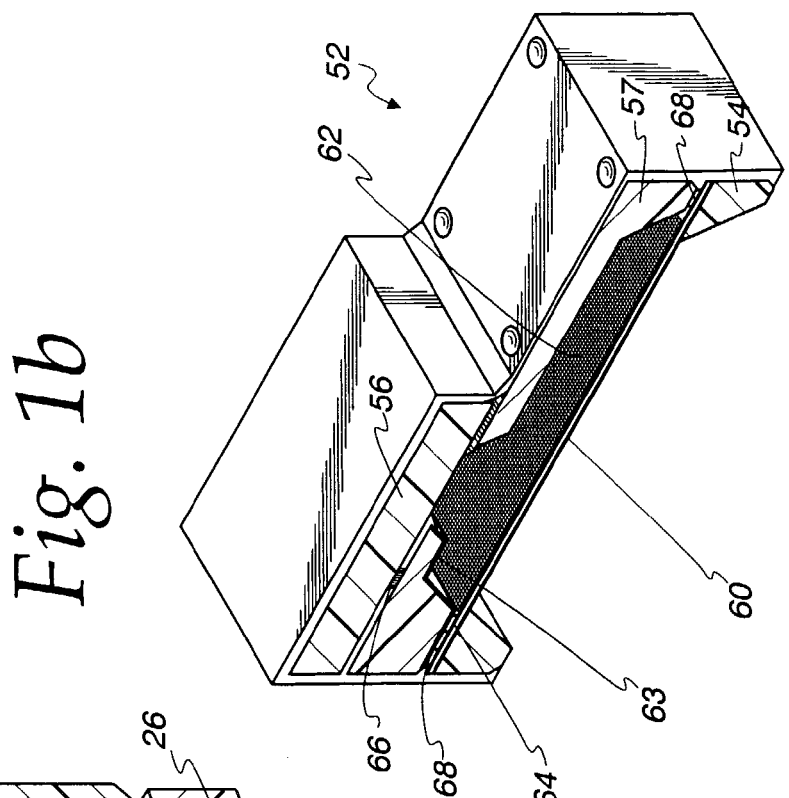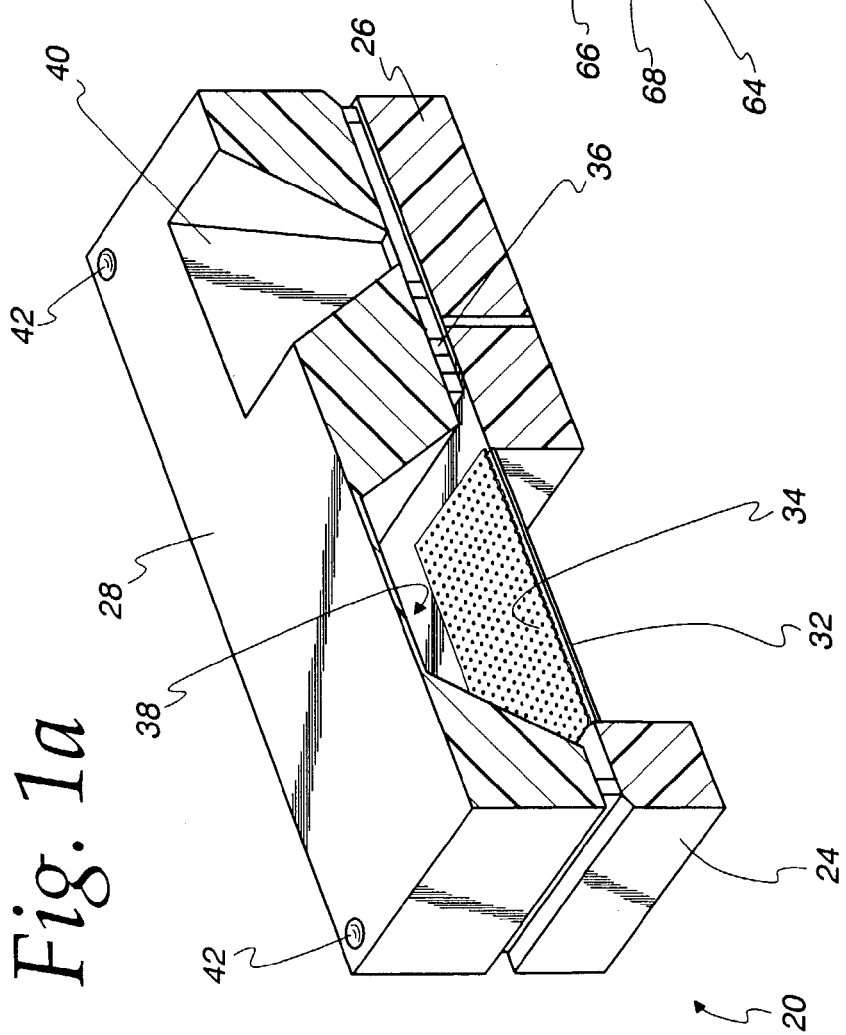

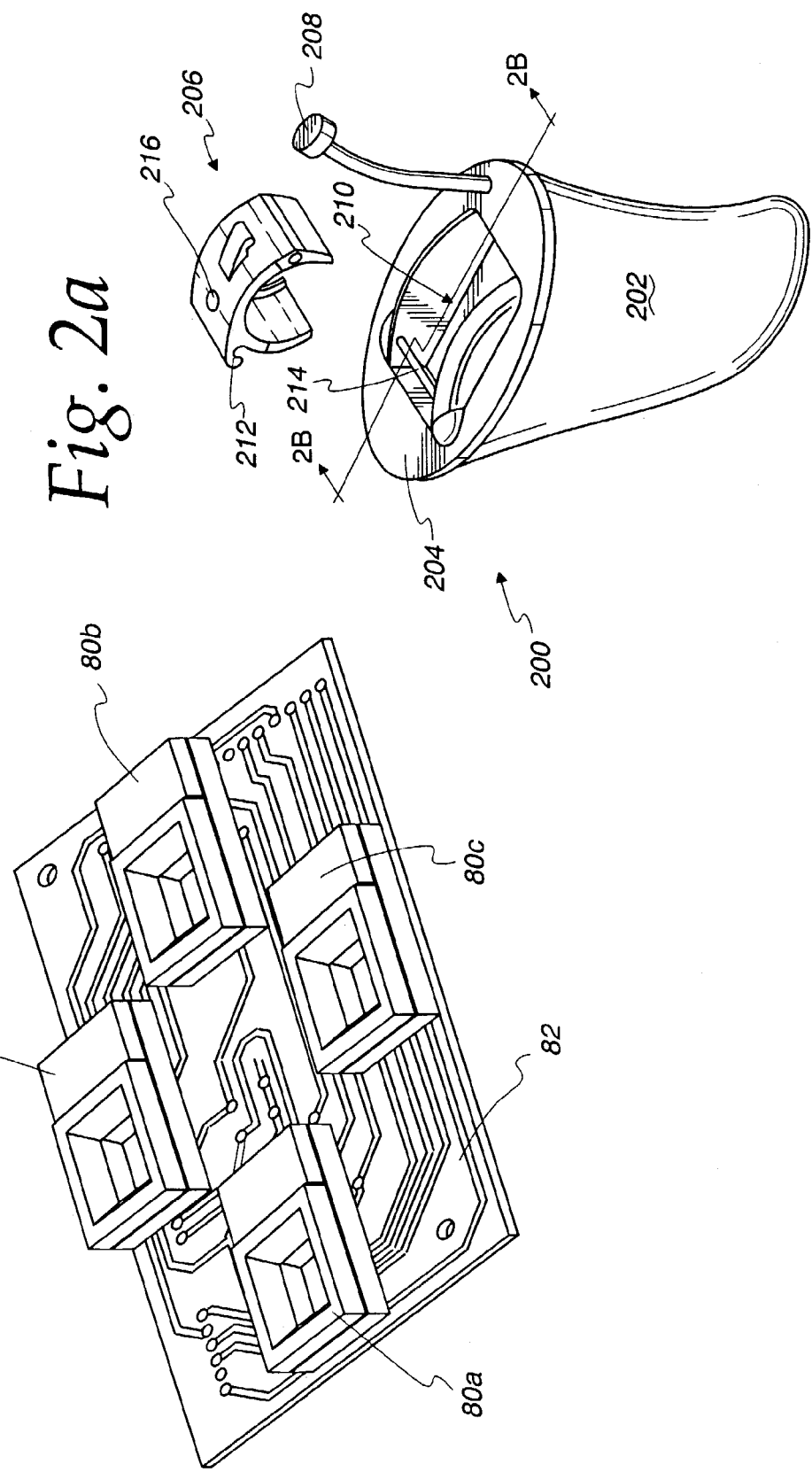

SILICON-BASED TRANSDUCER FOR USE IN HEARING INSTRUMENTS AND LISTENING DEVICES

FIELD OF THE INVENTION

The present invention relates generally to silicon-based transducers, and more particularly, to silicon-based transducers for use in hearing instruments and listening devices.

BACKGROUND OF THE INVENTION

A hearing instrument usually consists of a shell which is shaped to fit inconspicuously into an ear canal or behind an ear. The shell generally accommodates a microphone, a receiver (speaker), an amplifier or a DSP, and a battery. The microphone is typically of the electret condenser type, and the DSP or amplifier is ordinarily a separate component which must be hardwired to the other components of the hearing instrument. Producing a hearing instrument requires balancing several competing considerations including the volume and shape of the shell, cost, and the desired functions to be incorporated into the hearing instrument.

Fabrication of precision-machined electret condenser microphones (ECMs) is a relatively time- and labor-intensive process, and variations in uniformity and reliability pose challenges relative to the design and performance of microphones or transducer assemblies. For example, directional microphone applications using a matched pair require precise tolerances so as to avoid the undesired influences of sensitivity mismatching. The use of wires to connect components together inside a hearing instrument poses further challenges. Connecting wires is a labor-intensive process, and they are susceptible to electromagnetic interference which can adversely affect performance.

Many of the challenges posed by ECMs have been overcome with the advent of silicon-based transducers which are fabricated using microelectromechanical systems (MEMS) technology. A batch of these transducers can be fabricated on a single wafer, increasing uniformity and lowering production costs. They can also be surface mounted to a substrate by standard solder reflow techniques, thereby obviating the use of wires conventionally used with ECMs.

Multiple microphones can be arrayed to provide directionality or adaptive beam steering. In a conventional microphone array, such as a matched pair, each ECM in the array must be precision machined so as to have nearly identical sensitivity and/or response characteristics for optimal performance. Moreover, each additional ECM consumes more space, which poses yet additional design challenges.

Silicon-based transducers offer numerous advantages and characteristics including a small space consumption, uniformity, and reliability, for example. The present invention is directed to exploiting these advantages in hearing instruments and other applications.

SUMMARY OF THE INVENTION

According to one embodiment of the present invention, a hearing instrument includes a housing, a manually movable structure disposed adjacent an exposed portion of the housing, and a silicon-based transducer assembly mechanically or electrically coupled to the manually movable structure. The silicon-based transducer assembly includes an ASIC which includes any combination of an A/D converter, a D/A converter, a DSP, an amplifier, a preamplifier, a voltage stabilizer, a charge pump (also called voltage stepper or voltage upconversion), an impedance correction circuit, an oscillator, a filter, or a wireless interface. The transducer assembly also includes at least one silicon-based microphone. The manually movable structure is, in different embodiments, an access door, a rotatable dial, a switch, a touch pad, a flex-print or a printed circuit board.

In another embodiment, the silicon-based transducer assembly includes a wireless interface. The transducer assembly can also be incorporated into a disposable hearing instrument.

An array of silicon-based microphones is incorporated in a hearing instrument to increase overall signal-to-noise ratio, to achieve directionality, or to provide adaptive beam steering.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. 1A is a cutaway perspective view of a silicon-based transducer assembly suitable for use in the present invention.

FIG. 1B is a cutaway perspective view of another silicon-based transducer assembly suitable for use in the present invention.

FIG. 1C is a top view of an array of silicon-based transducer assemblies arranged on a substrate.

FIG. 2A is an exploded perspective view of a hearing instrument having an access door as a movable structure.

Figure 2C:
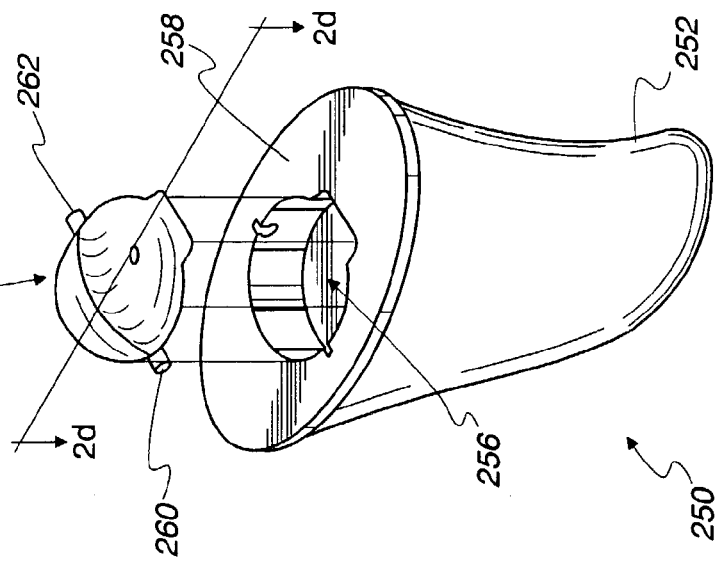
FIG. 2C is an exploded perspective view of a hearing instrument having a different access door from that shown in FIG. 2A as a movable structure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1A is a cutaway perspective view of a silicon-based transducer assembly 20 which generally includes a transducer chip 24 coplanar with an integrated circuit (IC) chip 26, an intermediate chip 28 disposed adjacent the transducer chip 24 and the IC chip 26. The transducer chip 24 includes a diaphragm 32 and backplate 34, which may be placed on either side of the diaphragm 32. A seal ring 36 surrounds the diaphragm 32 and backplate 34 to form a backchamber 38. Redistribution circuits on the intermediate chip 28 electrically connect the diaphragm 32 and backplate 34 to the IC chip 26. Pads 42 or solder bumps are disposed on an exposed surface of the intermediate chip 28 as shown for connection to external components such as a battery (not shown), an amplifier (not shown) or DSP (not shown), a wireless interface (not shown) or a receiver (not shown). The pads 42 are connected to the transducer chip and/or the ASIC via feedthroughs running through the feedthrough opening 40. Feedthrough connections can also be made through several feedthrough openings or through closed electrical feedthroughs. The transducer chip 24, the IC chip 26, and the intermediate chip 28 are silicon-based, i.e., include silicon in their composition.

The transducer assembly 20 is fabricated according to microelectromechanical system (MEMS) technology and optionally includes CMOS structures. As is known, a plurality of transducer assemblies may be batch processed on a single wafer. Their structure and fabrication are well known to those skilled in the art.

FIG. 1B illustrates a cutaway perspective view of a silicon-based transducer assembly 52 in a stacked arrangement. The transducer assembly 52 generally includes an intermediate chip 57 and a transducer chip 54 and an IC chip 56 flip-mounted to the intermediate chip 57 preferably using a fluxless soldering technique. An opening in the transducer chip 54 is covered by a movable diaphragm 60 and a backplate 62 which together form a capacitor whose capacitance varies as the diaphragm is moved in response to incident sound. The changes in capacitance are provided to the IC chip 56 via a feedthrough conductors 63. The feedthrough conductors 63 are coupled to the diaphragm 60 and backplate 62 by solder bumps 64 and to the IC chip 56 by interconnects 66, which could also be solder bumps. A seal ring 68 surrounds the diaphragm 60 and backplate 62. Additional details of the transducer assembly 52 shown in FIG. 1B are described and shown in U.S. Pat. No. 6,088,463, titled "Solid State Silicon-Based Condenser Microphone," issued Jul. 11, 2000, which is incorporated herein by reference in its entirety. It should be noted that the transducer assemblies shown in FIGS. 1A and 1B are exemplary, and that any other suitable silicon-based transducer assembly may be employed.

Silicon-based transducers can be batch processed on a single wafer in large quantities, and accordingly, each transducer is highly matched with the other transducers on the same wafer and even on different wafers. As a result, the silicon-based transducers remain stable over long periods of time and are relatively immune to undesired effects of temperature and humidity. These characteristics of silicon-based transducers make them attractive candidates for use in an array, such as a matched pair, and their relatively small size eliminates the space constraint challenges posed by the larger-sized legacy ECMs.

FIG. 1C illustrates four silicon-based transducer assemblies 80a, 80b, 80c, 80d arrayed (i.e., arranged in predetermined manner) on a printed circuit board 82. Alternately, they may be arrayed on a flex-print. Each of the transducer assemblies may be the transducer assembly 20 shown in FIG. 1A or the transducer assembly 52 shown in FIG. 1B or any other suitable silicon-based transducer assembly. In a preferred embodiment, each of the transducer assemblies 80a–d are fabricated from the same wafer to minimize variations in uniformity among transducer assemblies, however, the transducer assemblies 80a–d may be fabricated from different wafers. Note that the traces shown on the printed circuit board 82 are for illustrative purposes only, and are not meant to show actual placement of the traces.

In alternate embodiments, fewer or more than four silicon-based transducer assemblies may be employed without departing from the scope of the present invention. The array of transducer assemblies 80 can be adapted to provide beam forming or adaptive beam steering according to conventionally known techniques.

The array of silicon-based transducer assemblies 80 can be adapted to achieve directionality, particularly at high frequencies (such as above 4 kHz). Directionality can be achieved through beam forming using a matched-pair microphone or a microphone array. The silicon-based microphones described in connection with FIGS. 1A and 1B are well suited for matched-pair or array applications because they can be uniformly and reliably batch produced on a single wafer thereby reducing variations in sensitivity and phase responses from one microphone to another. Alternately, matched pair microphones or microphone arrays can be fabricated as a single assembly on a silicon wafer using MEMS-based fabrications techniques and including a shared IC chip. In one embodiment, two silicon-based transducer assemblies each having an output are provided on a substrate, and one output is time delayed and inverted to produce a delayed signal. The delayed signal is summed with the other output to produce a summed signal which is provided to processing circuitry for processing the summed signal. In an alternate embodiment, more than two silicon-based transducer assemblies are employed to achieve directionality.

As is known, signal-to-noise ratio can be increased by combining the outputs of multiple microphones. However space constraints due to the size of conventional electret condenser microphones and variations in manufacturing posed design challenges. The relatively miniature size of silicon-based transducers and batch processing capabilities relieve those design challenges, and therefore higher signalto-noise ratios, are more easily achieved by combining the outputs of multiple transducer assemblies.

In a preferred embodiment, the 1C chip 26 or the 1C chip 56 described in connection with FIGS. 1A and 1B, respectively, is an application specific integrated circuit (ASIC). The ASIC preferably includes CMOS structures. The ASIC includes any combination of one or more of the following conventionally known circuit components: an analog-to-digital converter, a digital-to-analog converter, a digital signal processor (DSP), a microprocessor, a preamplifier, a Class-D amplifier, a voltage stabilizer, a charge pump, an impedance correction circuit, an oscillator, a filter such as a low-frequency roll-off filter, an oscillator, and a wireless interface. The wireless interface includes a receiver and a transmitter for receiving and transmitting wireless signals, respectively, and optionally includes a modem. The Class-D amplifier may be a pulse width modulated (PWM) or pulse density modulated (PDM) amplifier. The transducer assemblies of FIGS. 1A and 1B may include one or several sensors and/or actuators. Such sensor may be adapted to detect any combination of temperature, humidity, acceleration, rotation, tilt, pressure, finger touch, or movement. The output of the sensor is provided to compensation circuitry adapted to compensate for changes in the ambient. An actuator may include a receiver (speaker) or a switch.

A high-frequency roll-off filter is achieved by placing a capacitor (not shown) over the appropriate pads 42 corresponding to the outputs of the transducer chip 24 or 54. Alternately, the capacitor may be integrated into the intermediate chip 28 or 57 or into the IC chip 26 or 56.

Note that the use of the term "arrayed" to describe the arrangement of silicon-based transducer assemblies is not intended to convey that the assemblies must be arranged in rows and columns. For example, an odd number of assemblies may be arranged in a predetermined fashion on the printed circuit board 82.

The array of silicon-based transducer assemblies 80 may be connected in parallel via a 3- or 4-wire low-voltage, low-power system bus, such as the system bus described in commonly owned, U.S. Patent Application Ser. No. 60/416,952, titled "Digital System Bus For Use in Low Power Instruments Such As Hearing Aids And Listening Devices," which is incorporated herein by reference in its entirety. An appropriate interface is integrated into the silicon-based transducer assembly for proper application of the system bus.

Turning now to FIG. 2A, there is shown an exploded, perspective view of a hearing instrument 200 in accordance with one aspect of the present invention. The hearing instrument 200 generally includes a housing 202, a faceplate 204, a manually movable access door 206, and a retrieval line 208. The faceplate 204 has an opening 210 shaped to receive the access door 206. The access door 206 is hingedly connected to the housing 202 when a clip portion 212 of the access door 206 is mated with a pin 214 as shown in FIG. 2B. The retrieval line 208 can be grasped by the wearer of the hearing instrument 200 to facilitate removal thereof from the ear canal. In one embodiment, the access door 206 provides access to a battery (not shown).

FIG. 2B is a cross-sectional view of the hearing instrument 200 showing the placement of a silicon-based transducer assembly 220 installed in the access door 206. In alternate embodiments, the silicon-based transducer assembly 220 may be the transducer assembly 20 shown in FIG. 1A, the transducer assembly 52 shown in FIG. 1B, or the array of transducer assemblies 80 shown in FIG. 1C. The aperture 216 in the access door 206 permits access of sound to the transducer assembly 220. In an embodiment where an array of transducer assemblies is installed in the access door 206, apertures are formed in the access door 206 to permit access of sound to each of the transducer assemblies. The transducer assembly 220 may optionally be coupled to a printed circuit board or flex-print. Connections to a power supply, such as a battery, from the transducer assembly 220 are made by conventional techniques known to those skilled in the art. Such connections may be realized, for example, by using pads, wires, traces, solder bumps, or a combination thereof.

Figure 2D:
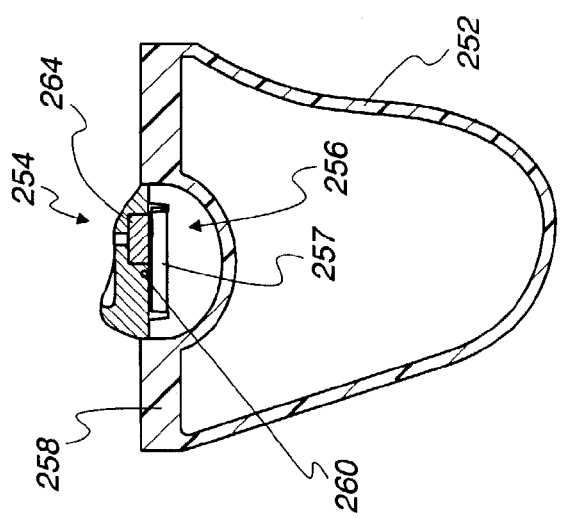
FIG. 2D is a cross-sectional view of the hearing instrument shown in FIG. 2C with the access door disposed in a closed position.
Figure 2B:
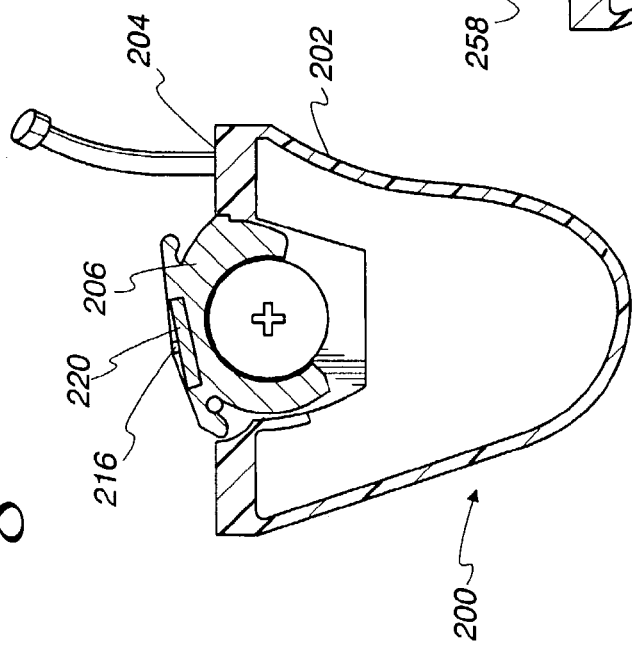
FIG. 2B is a cross-sectional view of the hearing instrument shown in FIG. 2A with the access door disposed in a closed position.

FIG. 2C shows a hearing instrument 250 having a housing 252 and a manually movable access door 254 disposed adjacent an opening 256 in a faceplate 258 and hingedly connected thereto by pins 260, 262. The faceplate 258 is attached to the housing 252 or may be integrally formed as part of the housing 252. A silicon-based transducer assembly 264 is disposed in the access door 254 as shown in FIG. 2D and is manually movable with the access door 254. The silicon-based transducer assembly 264 may be the transducer assembly 20 shown in FIG. 1A, the transducer assembly 52 shown in FIG. 1B, or the array of transducer assemblies 80 shown in FIG. 1C. The transducer assembly 264 may optionally be coupled to a printed circuit board or flex-print. Connections to a power supply, such as a battery 257, from the transducer assembly 264 are made by conventional techniques known to those skilled in the art.

Figure 2E:
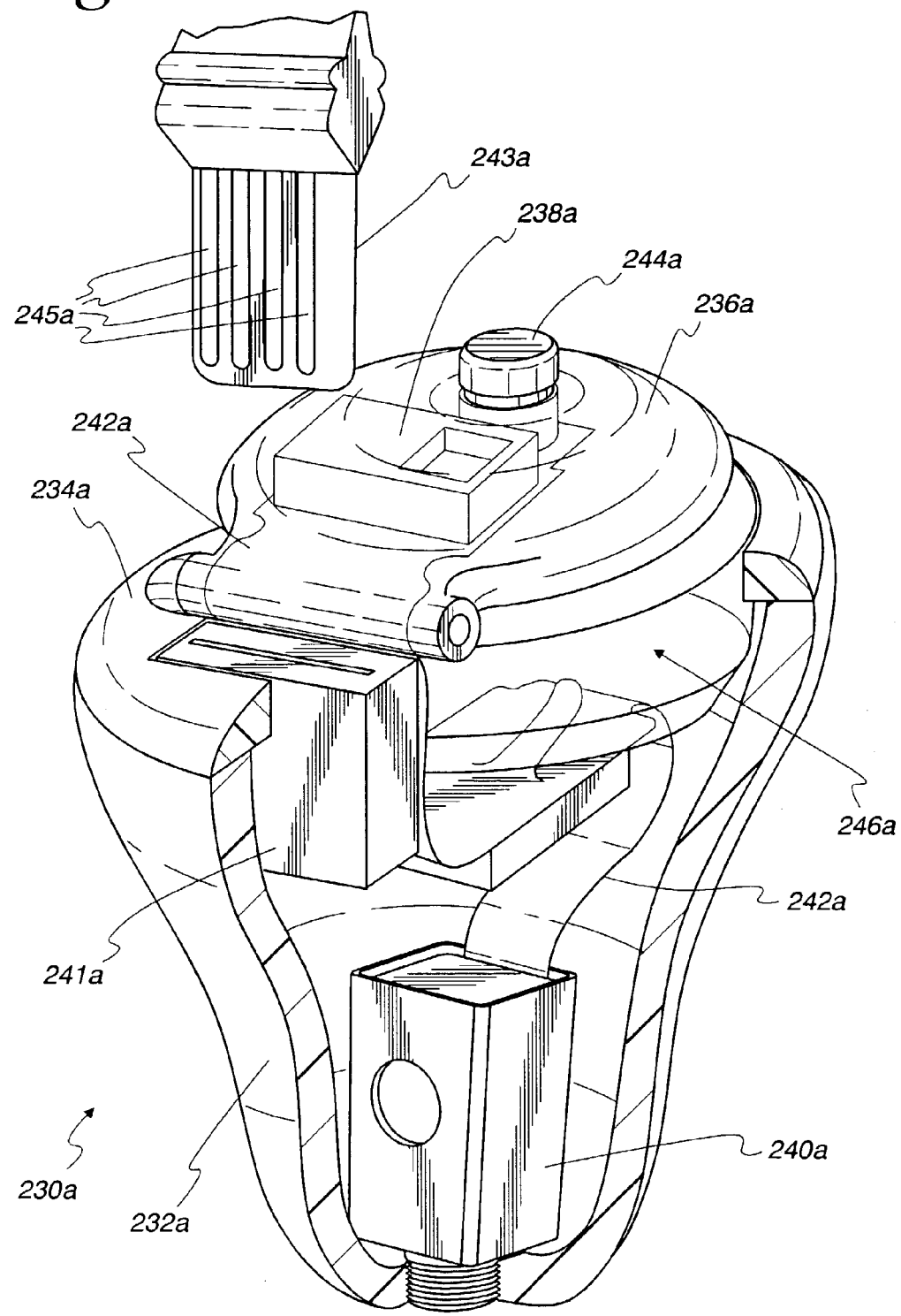
FIG. 2E is a partial cutaway perspective view of a hearing instrument having an access door with a silicon-based transducer assembly incorporated therein on a flexprint and a horizontally mounted battery.

FIG. 2E is a partial cutaway perspective view of a hearing instrument 230 according to another embodiment of the present invention. The hearing instrument 230a generally includes a housing 232a, a faceplate 234a, a battery access door 236a, a silicon-based transducer assembly 238a, and a receiver (speaker) 240a. The battery access door 236a is shown as transparent and partially ajar for ease of illustration, and is manually movable between an open and closed position. The silicon-based transducer assembly 238a is mounted on a flexprint 242a which electrically couples the transducer assembly 238a to a control 244a, a battery 246a, and the receiver 240a. The battery 246a is also shown as transparent for ease of illustration. Note that the transducer assembly 238a is movable with the access door 236a. The access door 236a is hingedly connected to the faceplate 234a to facilitate installation and removal of the battery 246a. The control 244a is a push button, though in other embodiments, it may be a volume dial, a toggle switch, a touch pad, or the like for adjusting hearing instrument parameters such as volume, sensitivity, directionality, frequency response, and gain.

The hearing instrument 230a also includes a connector 241a coupled to the flexprint 242a. The connector 241a is adapted to receive an externally provided programming strip 243a which is composed of a flexprint or substrate that carries a plurality of terminals 245a. The number of terminals 245a may vary from the illustration. The programming strip 243a is used to program any combination of characteristics of the hearing instrument 230a. These characteristics include sensitivity, frequency response, gain, and directionality. To cause the hearing instrument 230a to be programmed, the programming strip 243a is inserted into the connector 241a. Programming instructions are communicated between a programming unit (not shown) and the hearing instrument 230a along the flexprint 242a according to conventionally known techniques. The power during programming may be supplied by the battery 246a or the programming unit.

Figure 2F:
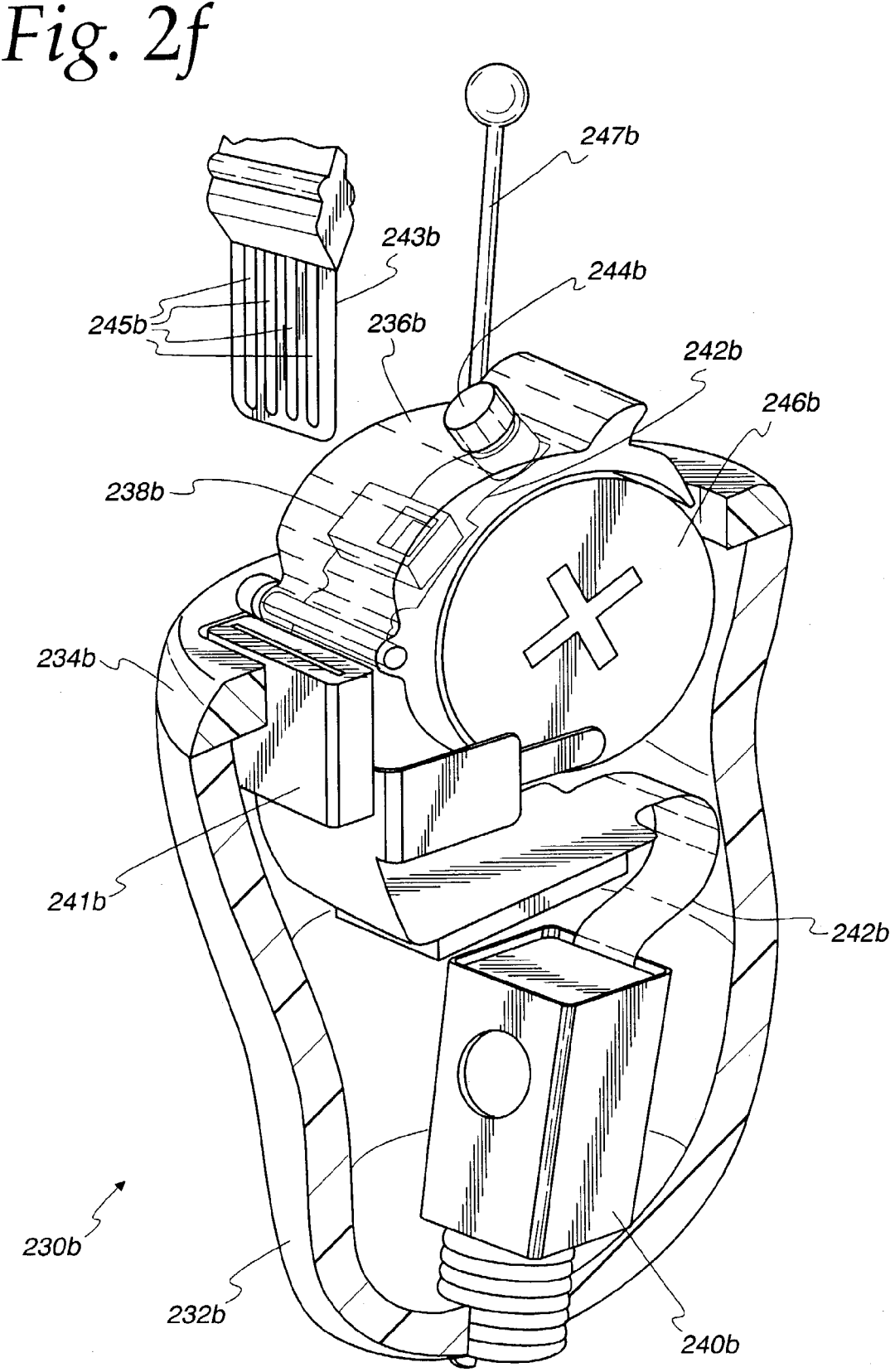
FIG. 2F is a partial cutaway perspective view of a hearing instrument having an access door with a silicon-based transducer assembly incorporated therein on a flexprint and a vertically mounted battery.

FIG. 2F illustrates a hearing instrument 230b having a different battery access door 236b according to another embodiment of the present invention. The hearing instrument 230b generally includes a housing 232b, a faceplate 234b, a battery access door 236b, a silicon-based transducer assembly 238b, and a receiver (speaker) 240b. The battery access door 236b holds a battery 246b as shown and includes a control 244b for adjusting parameters of the hearing instrument 230b. The battery access door 236b is manually movable between an open and closed position. A flexprint 242b electrically couples a silicon-based transducer assembly 238b to the control 244b, the battery 246b, and the receiver 240b.

The hearing instrument 230b also includes a connector 241b which receives a programming strip 243b carrying a plurality of terminals 245b. The hearing instrument 230b also includes a retrieval line 247b to facilitate insertion and removal of the hearing instrument 230b relative to the operator's ear canal. In an embodiment, the retrieval line 247b also functions as an antenna to communicate wireless data between the hearing instrument 230b and another system, such as another hearing instrument or a network. The wireless communication is described in further detail with reference to FIG. 5.

Figure 2G:
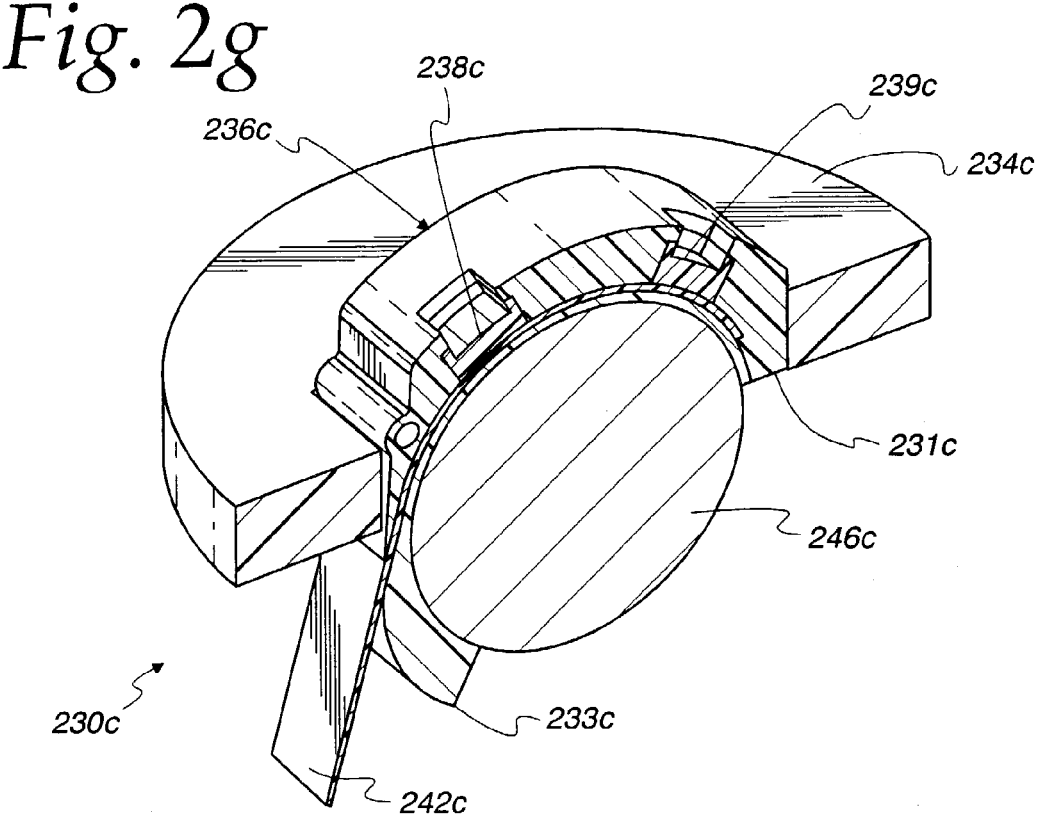
FIG. 2G is a partial cutaway perspective view of two silicon-based transducer assemblies injection molded into a battery access door of a hearing instrument.

FIG. 2G is an illustration of two silicon-based transducer assemblies mounted into a battery door of a hearing instrument 230c by injection molding techniques. The hearing instrument 230c includes a two-piece, manually movable access door 236c composed of a cap 231c and a support piece 233c. A flexprint 242c is sandwiched between the cap 231c and the support piece 233c, and a first silicon-based transducer assembly 238c and a second silicon-based transducer assembly 239c are electrically coupled to the flexprint 242c. The flexprint 242c depends into the hearing instrument 230c to connect a receiver (speaker). Connections to the battery 246c are made according to conventionally known techniques.

Figure 2H:
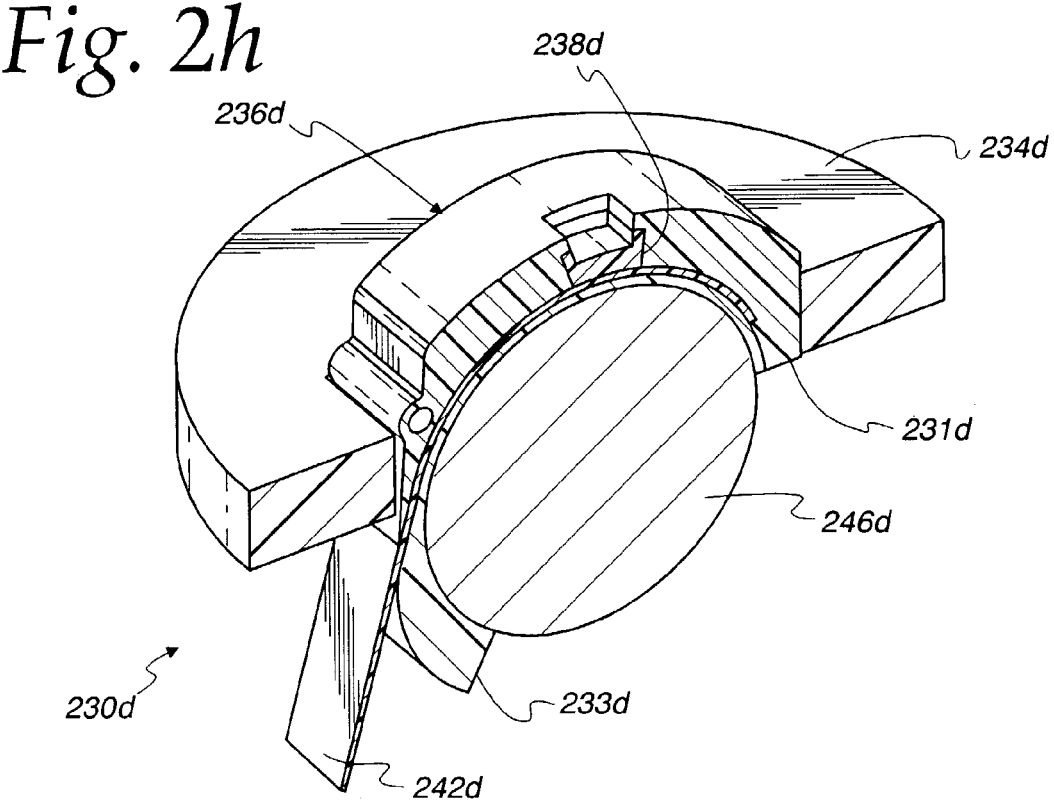
FIG. 2H is a partial cutaway perspective view of a silicon-based transducer assembly injection molded into a battery access door of a hearing instrument.

FIG. 2H is identical to FIG. 2G except that only one silicon-based transducer assembly is shown. A hearing instrument 230d includes a two-piece, manually movable access door 236d composed of a cap 231d and a support piece 233d. A flexprint 242d is sandwiched between the cap 231d and the support piece 233d, and a silicon-based transducer assembly 238d is electrically coupled to the flexprint 242d. The flexprint 242d depends into the hearing instrument 230d to connect a receiver (speaker). Connections to the battery 246d are made according to conventionally known techniques.

The connection between the faceplate and battery access door shown in FIGS. 2A–2H may be modified to provide vibration isolation by forming a suspension between the faceplate and battery access door. Because the combined mass of the battery access door and the battery is relatively high, a reasonably stiff suspension would obtain a relatively low resonance frequency (around a couple of 100 Hz), which improves performance in the 2–3 kHz range. The suspension is preferably formed along the hinge connecting the battery access door to the faceplate and along the portion of faceplate that holds the battery door in a secure position such that the battery access door "sits up" or is suspended from the faceplate so that vibrations are transmitted via the suspension to the access door.

Another feature of the access doors shown in FIGS. 2A–2H is that they are easily replaced and repaired without having to send the hearing instrument back to the factory. Replacement and/or repair of the hearing instrument can be done by the user. Preferably, the battery access door is coupled to the faceplate or housing of the hearing instrument by a solderless connection, permitting easy replacement and repair of a damaged component. For example, if the silicon-based transducer becomes damaged, the user can order a replacement access door containing a new silicon-based transducer from the factory. The factory would mail a replacement access door with integrated transducer to the user with appropriate instructions. In this manner, a user's hearing instrument may also be upgraded, for example, to a hearing instrument capable of achieving directionality.

Figure 3:
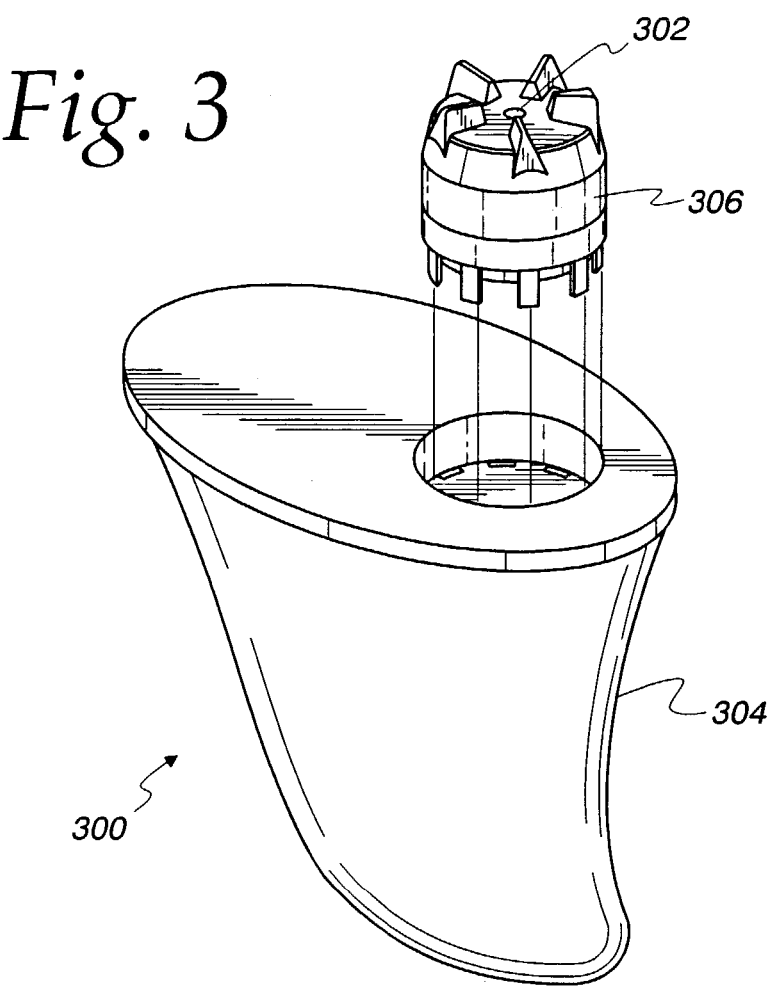
FIG. 3 is an exploded perspective view of a hearing instrument having a rotatable dial as a movable structure.
Figure 3A:
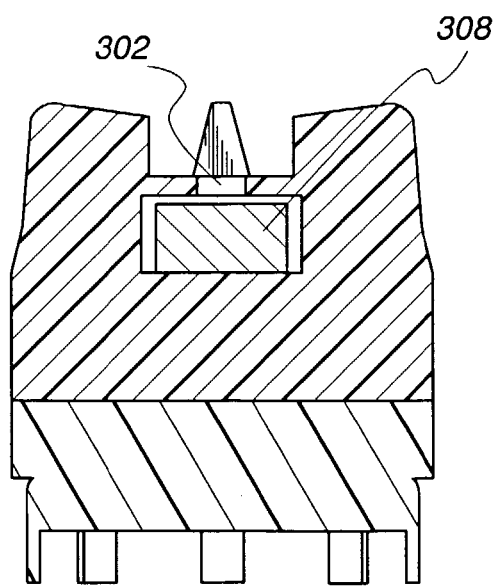
FIG. 3A is a cross-sectional view of the rotatable dial of the hearing instrument shown in FIG. 3.

FIG. 3 shows a manually movable dial 306 which is secured to a housing 304 of a hearing instrument 300. The dial 306 includes an aperture 302 and a silicon-based transducer assembly 308 disposed adjacent the aperture 302 in the dial 306 as shown in FIG. 3A. The dial 306 is movable in a rotational direction to adjust a characteristic of the hearing instrument 300, such as volume or sensitivity. The transducer assembly 308 is the transducer assembly 20 shown in FIG. 1A, though in alternate embodiments, the transducer assembly 308 may be the transducer assembly 52 shown in FIG. 1B, or the array of transducer assemblies 80 shown in FIG. 1C. In the latter alternate embodiment that includes an array of transducer assemblies, the dial 302 includes a plurality of apertures positioned and dimensioned to permit access of sound to each of the corresponding transducer assemblies.

Figure 3B:
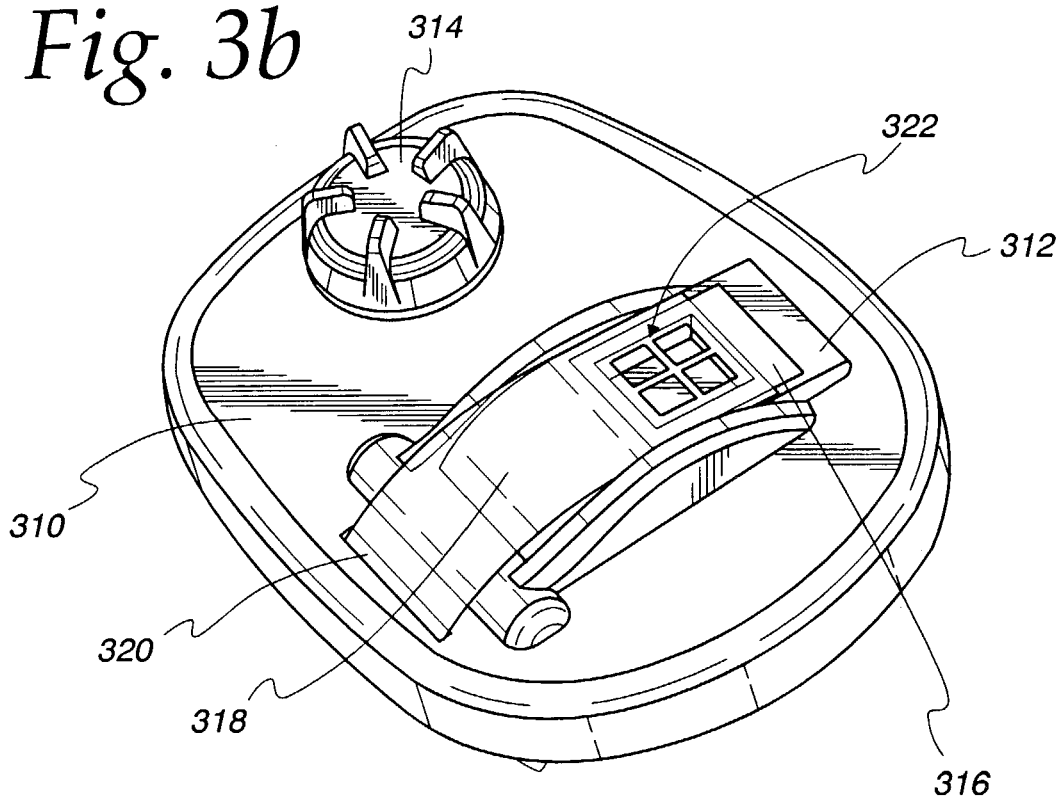
FIG. 3B is a perspective view of a faceplate of a hearing instrument showing a protection strip covering a closed battery access door.
Figure 3C:
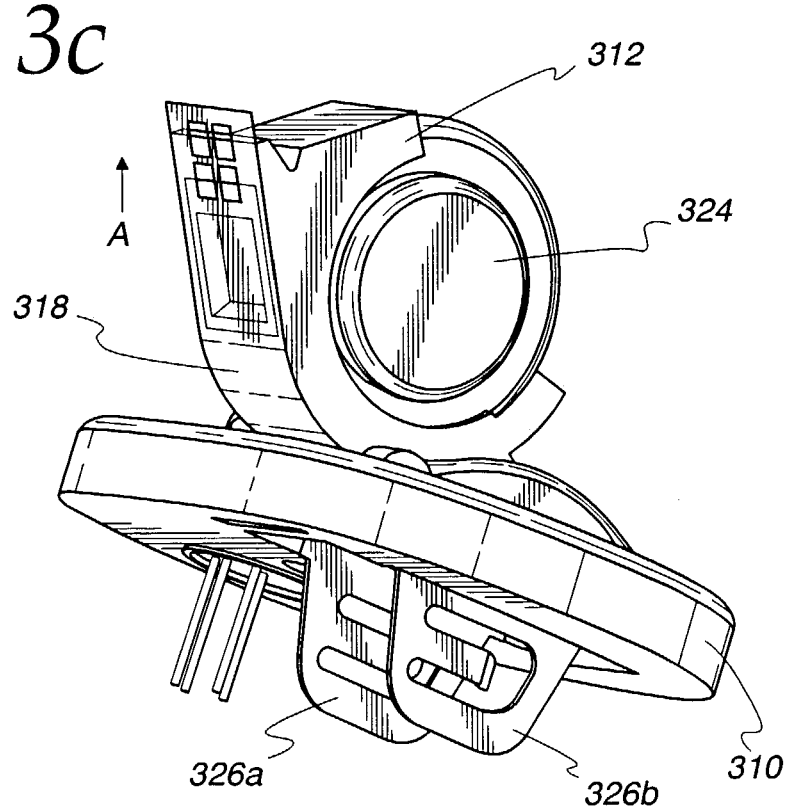
FIG. 3C is a perspective view of the faceplate shown in FIG. 3B showing a position of the protection strip when the battery access door is opened.

FIGS. 3B and 3C illustrate different views of a faceplate 310 of a hearing instrument having a protection strip 318 (shown as transparent for ease of illustration) disposed across a battery access door 312. A silicon-based transducer assembly 316 is integrated into the battery access door 312 in accordance with any embodiment described above. The protection strip 318 is secured to the faceplate 310 by a connection 320 using an adhesive, a clamping member, or the like. When the battery access door 312 is in a closed position (as shown in FIG. 3B), the protection strip 318 covers and protects the silicon-based transducer assembly 316 and permits sound access via a grid 322 which is formed in the area that coincides with the sound access area of the silicon-based transducer. The protection strip 318 is preferably composed of the same material as the faceplate 310 such as plastic (Kapton), or any other suitable material.

The holes in the grid 322 are dimensioned so as to critically damp the microphone to have an acoustic roll-off above 10 kHz to prevent spurious signals above 10 GHz (such as signals from ultrasonic alarm systems, garage door openers, and the like) from adversely affecting the internal electronics of the hearing instrument. In addition, various parameters of the hearing instrument can be programmed by altering the amount, dimensions, and positions of the holes in the grid 322 as well as by altering the thickness of the protection strip 318. Accordingly, the protection strip 318 can be easily replaced with another by de-attaching the protection strip 318 from its connection 320. Additional parameters may be adjusted via a control dial 314 mounted to the faceplate 310.

As can be seen from FIG. 3C, when the battery access door 312 is opened to reveal a battery 324, the grid 322 of the protection strip 318 is extended beyond the battery access door 312 in the direction of arrow A. The extended portion of the protection strip 318 can then be peeled away from the battery access door 312 to clean the grid 322 of any debris that may have accumulated in the holes of the grid 322. The ability to clean the grid 322 is particularly useful for wearers of hearing aids who also use hairspray or work in dusty environments. Alternately, the protection strip 318 can be simply be replaced instead of cleaned by detaching the protection strip 318 from the connection 320 as described earlier and reattaching a replacement strip. After cleaning the grid 322 of the protection strip 318, the battery access door 312 is closed, and power to the internal circuitry of the hearing instrument is restored via terminals 326a,b.

Figure 4:
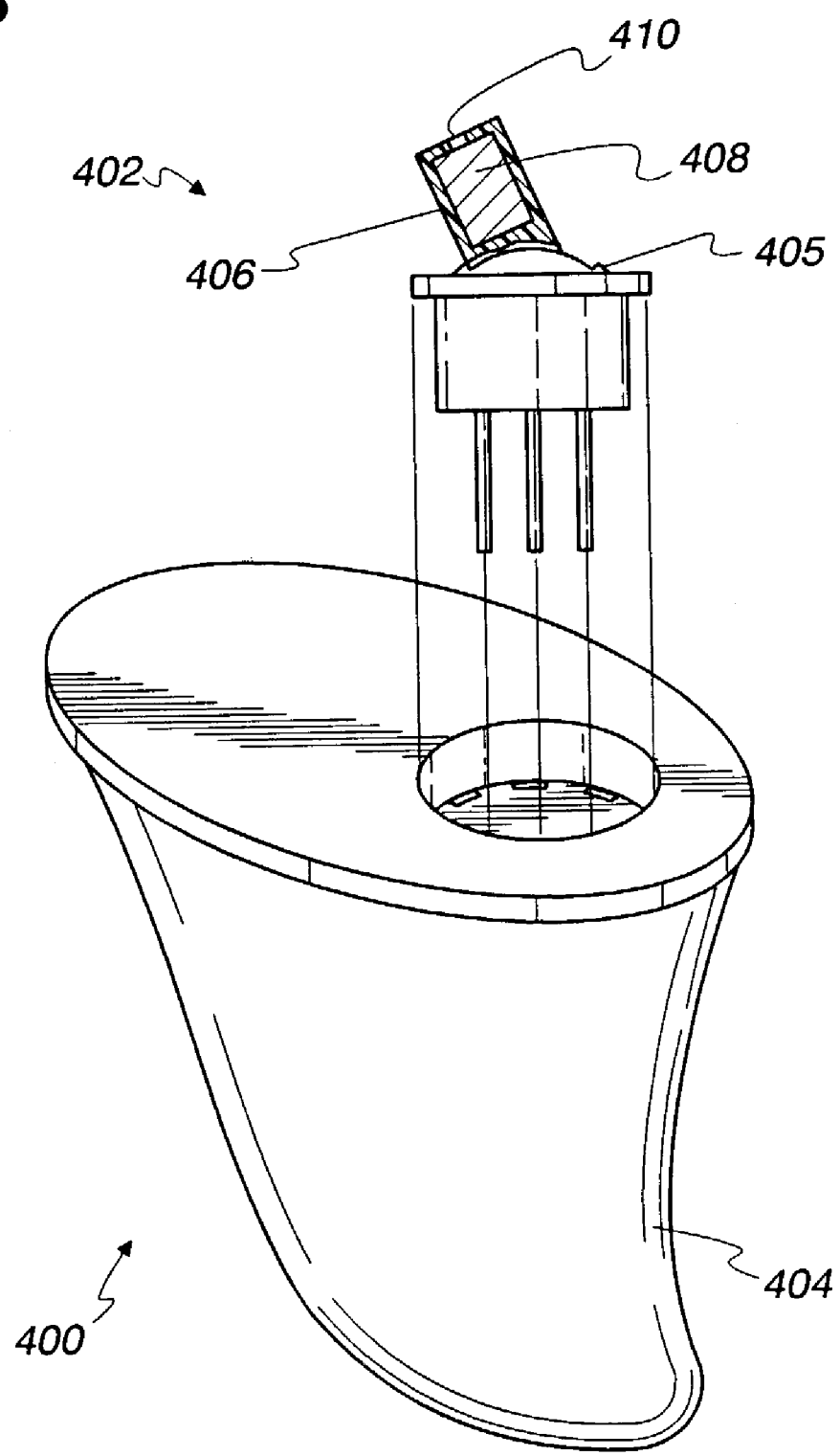
FIG. 4 is a perspective cutaway view of a hearing aid having a toggle switch as a movable structure.

In FIG. 4, the movable structure is a switch 402, which is secured to a housing 404 of a hearing instrument 400. The switch 402 includes a base portion 405 and a protruding portion 406. A silicon-based transducer assembly 408 is disposed in the protruding portion 406 of the switch 402. An aperture 410 is formed at the exposed end of the protruding portion 406 to permit access of sound to the transducer assembly 408 as shown. The transducer assembly 408 is the transducer assembly 20 shown in FIG. 1A, though in alternate embodiments, the transducer assembly 408 may be the transducer assembly 52 shown in FIG. 1B, or the array of transducer assemblies 80 shown in FIG. 1C.

Although the transducer assembly 408 is shown in the protruding portion 406 of the switch 402, the protruding portion 406 could be replaced by the transducer assembly 408 and an optional substrate so that the transducer assembly 408 forms a protruding portion. In alternate embodiments, the switch 402 may be of the toggle, rotary, or pushbutton type. In the case of a toggle or rotary switch, the transducer assembly 408 may be disposed in any position in the protruding portion or may itself form the protruding portion. In the case of a pushbutton switch, the transducer assembly may be disposed in the depressable portion of the pushbutton or may itself form the depressable portion.

In yet another embodiment of the present invention, the movable structure is a touch pad disposed over an opening or cavity in a housing of a hearing instrument. A silicon-based transducer assembly, such as the transducer assembly 20 shown in FIG. 1A, is disposed adjacent the touch pad which includes an aperture to permit access of sound to the transducer assembly. As is known, a touch pad typically includes two transparent films separated by a nonconducting material to maintain a distance between the two films. When the two films are pressed together, driver circuitry and associated software detect the location of touch and perform a programmed function. In this manner, the touch pad operates as a switch, and may be programmed to perform a certain function when the touch pad is touched.

In alternate embodiments, the function may be turning the hearing instrument on or off, switching the hearing instrument to a telecoil mode, switching to wireless mode as described in connection with FIG. 5, switching to a different acoustic environment mode, changing directionality profiles, or regulating the volume. In addition, by continuously monitoring the touch locations, the driver circuitry and software can detect direction. Thus, when the operator runs a finger along the surface of the touch pad in a certain direction, the direction of movement is interpreted by software and a function is performed, such as lowering or raising volume, raising or lowering sensitivity. The touch pad embodiment may be adapted for use in a Behind-The-Ear hearing instrument, though it is also suitable for use in a hearing instrument of the Completely-In-Canal, In-the-Canal, or In-The-Ear type.

The hearing instruments 200, 250, 300, 400 shown in FIGS. 2A to 4 are hearing aids of the Completely-In-Canal type, although in alternate embodiments, they may be of the In-the-Canal, In-the-Ear, or Behind-the-Ear type. Although a faceplate is shown in the hearing instruments illustrated in FIGS. 2A to 4, it is understood that in other embodiments, the faceplate may be eliminated and the movable structure disposed in an opening or cavity in the housing of the hearing instrument without departing from the scope of the present invention. In one embodiment, the shell and manually movable structures shown in FIGS. 2A to 4 are made by conventional SLA (stereolithography) techniques. The manually movable structure (e.g., battery access door) is built up using stereolithography techniques leaving an opening for a modules containing the working elements of the hearing instrument. This approach simplifies the manufacturing process, and avoids using multiple techniques to form the housing of the hearing instrument.

In other embodiments, the shape of the manually movable structure is customized using stereolithography techniques to optimize the placement of the silicon-based transducer(s) for each individual wearer. Because the silicon-based transducer is coupled to the manually movable structure, the shape of the manually movable structure (such as more or less convex), the position and number of the silicon-based transducers, and ridges and other deformations on the manually movable structure can be adjusted or formed to compensate for diffraction and ear and head geometry of each individual wearer and to make directionality possible for hearing instruments.

The conductive wires to connect the silicon-based transducer to other working components of the hearing instrument may also be integrated by using stereolithography. Because the wires are in place before assembly, the silicon-based transducers can be easily inserted and replaced. It should be noted that the conductive wires may be made of conductive rubber.

Any of the transducer assemblies shown and described in connection with the foregoing may operate as a switch by detecting transients in air pressure induced by touching the sound inlet of the transducer assembly. Because the transients in pressure would be higher than typical sound pressures, they can be detected by detecting an overload or collapse of the membrane.

It should be noted that the hearing instruments described above may be adapted to be disposable. Disposable hearing instruments should be relatively inexpensive to increase their attractiveness. Lower costs may be achieved by reducing the functional components in the ASIC, fixing the battery in the housing without providing an access door, using cheaper materials, or using silicon-based microphones that do not entirely meet quality control standards but are still functional.

The teachings of the present invention extend to other devices besides hearing instruments such as hearing aids. For example, the present invention contemplates any device capable of transducing between acoustic signals and corresponding electrical signals, such as an earphone, a headphone, or a headset, for example. Any of the embodiments described herein may be incorporated into any such device. Accordingly, a silicon-based transducer may be a silicon-based microphone or a silicon-based receiver (speaker), depending upon the application.

Figure 5:
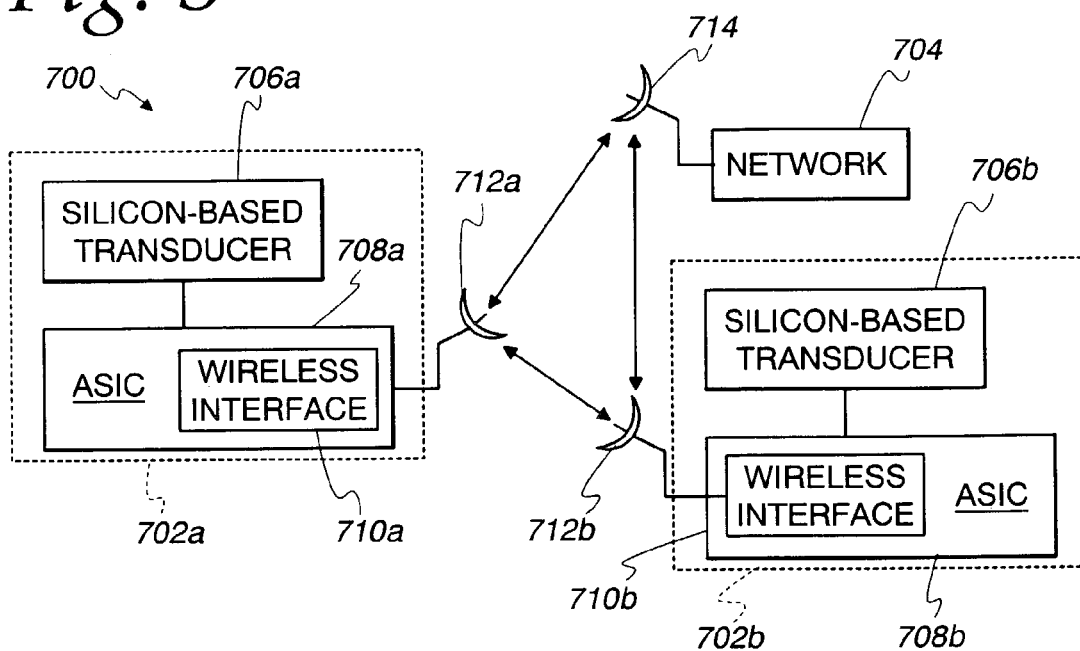
FIG. 5 is a block diagram of a wireless system according to a specific aspect of the present invention.

FIG. 5 illustrates a block diagram of a wireless system 700 that generally includes a hearing instrument 702a, an optional hearing instrument 702b, and a network 704. The hearing instruments 702a,b may be any of the hearing instruments described above, and include a silicon-based transducer assembly 706a,b, an ASIC 708a,b, and a wireless interface 710a,b, respectively. The silicon-based transducer assemblies 706a,b may be any of the transducer assemblies described in connection with FIGS. 1A to 1C. In another embodiment, the silicon-based transducer assemblies 706a,b are silicon-based receivers. The wireless interfaces 710a,b are coupled to antennas 712a,b, respectively. The network 704 is coupled to an antenna 714. In a specific embodiment, the wireless interfaces 710a,b are short-range RF links. The wireless interfaces 710a,b also include conventional transceivers and modems for enabling wireless communication.

As shown in FIG. 5, wireless communication may be established between the hearing instruments 702a, 702b and the network 704 or between the hearing instrument 702a and the hearing instrument 702b to communicate wireless data therebetween. The wireless data may be modulated according to any conventionally known modulation technique, and may be transmitted or received on carriers in any suitable frequency range, such as Bluetooth, 802.11, cellular, RF, and so forth.

In one embodiment, the network 704 communicates wireless data to the hearing instrument 702a in the form of modulated audio signals. In this embodiment, the network 704 broadcasts specific audio data over the wireless spectrum to hearing instruments which are adapted for wireless communications. In this manner, for example, a hearing impaired person sitting in the back of a large conference room may comfortably hear a distant speaker, or an undercover agent may discretely receive instructions from a remote operator without compromising his cover.

In another embodiment, the network 704 communicates wireless data to the hearing instrument 702a in the form of programming instructions. The programming instructions contain data which adjusts characteristics of the hearing instrument 702a. The characteristics include sensitivity, gain, frequency response, and directionality. The programming may occur as the hearing instrument 702a is worn by its operator, thus allowing the operator to hear the effects immediately. The programming instructions may also be used to program a different function associated with a movable structure on the hearing instrument. For example, when the movable structure is a rotatable dial, such as described in connection with FIGS. 3 and 3A, and adapted to change the volume of a receiver, the programming instructions may program the function of the rotatable dial to change sensitivity or other characteristic of the hearing instrument. In the case where the movable structure is a toggle switch, such as described in connection with FIG. 4, the function(s) associated with the toggle switch may be altered using the programming instructions.

In still another embodiment, the hearing instrument 702a communicates wireless data between the hearing instrument 702b. For example, this embodiment allows two hearing instruments worn by an operator to communicate audio signals for improved directional or truly three-dimensional hearing.

In yet another embodiment, the hearing instrument 702a is programmed through ultrasound. The silicon-based transducer is sensitive up to 100 kHz, which allows the hearing instrument 702a to be programmed without additional cables, flex strips, RF devices, etc. In this embodiment, the silicon-based transducer assembly includes a digital filter to extract wireless data including audio data and programming information carried over ultrasound frequencies. Ultrasound transmission is improved by mounting the silicon-based transducer assembly in a manner described herein.

Figure 6:
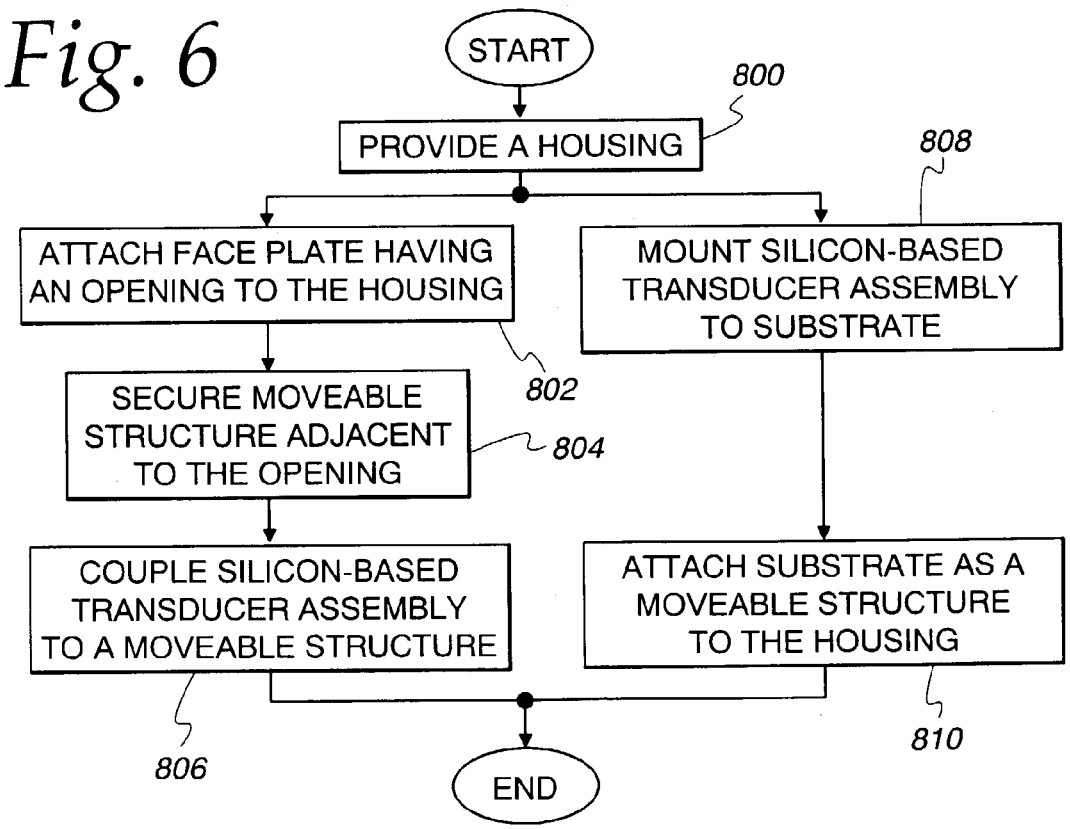
FIG. 6 is a flow chart diagram of methods of assembling a hearing instrument according to specific aspects of the present invention.

FIG. 6 is a flow chart of a method of assembling a hearing instrument according to the present invention. It should be noted that although the steps are shown in FIG. 6 in a particular order, the steps may be performed in any order without departing from the scope of the present invention. At step 800, a housing is provided. In one embodiment, a faceplate having an opening is attached to the housing at step 802. A moveable structure is secured adjacent the opening at step 804, and at step 806, a silicon-based transducer assembly is coupled to the moveable structure. In another embodiment, a silicon-based transducer assembly is mounted to a substrate at step 808, and the substrate is attached as a moveable structure to the housing at step 810.

The housing, faceplate, moveable structure, and silicon-based transducer assembly are described in further detail in connection with FIGS. 1A to 5 and may be used in various embodiments in accordance with the method shown in FIG. 6.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A hearing instrument, comprising:
a housing having an exposed portion to the environment, the exposed portion having an opening therethrough;
a silicon-based transducer assembly; and
a manually movable structure disposed in said opening, said manually movable structure having a custom shape formed by stereolithography to optimize placement of said silicon-based transducer for the wearer of said hearing instrument, said silicon-based transducer assembly being coupled to said manually movable structure.

2. The hearing instrument of claim 1, wherein said manually movable structure is an access door, said silicon-based transducer assembly being secured to said access door, said access door having at least one aperture to permit access of sound to said silicon-based transducer assembly.

3. The hearing instrument of claim 2, wherein said access door is hingedly coupled to said housing.

4. The hearing instrument of claim 2, wherein said access door is removably secured to said housing.

5. The hearing instrument of claim 1, wherein said housing includes a faceplate, said faceplate being said exposed portion of said housing.

6. The hearing instrument of claim 1, wherein said manually movable structure is one of an access door, a rotatable dial, a switch, a touch pad, a flex-print, and a printed circuit board, said silicon-based transducer assembly moving with said manually movable structure.

7. The hearing instrument of claim 6, wherein said switch is one of a toggle switch, a rotary switch, a momentary switch, and a pushbutton switch.

8. The hearing instrument of claim 1, wherein said manually movable structure is adapted to be one of rotated, toggled, flipped, hinged, pushed, pressed, and touched.

9. The hearing instrument of claim 1, wherein said silicon-based transducer assembly includes a silicon-based microphone formed according to MEMS-based technology.

10. The hearing instrument of claim 9, wherein said microphone includes:
a silicon-based transducer chip including a backplate and a diaphragm, said diaphragm being movable relative to said backplate in response to incident sound;
an integrated-circuit chip for receiving an electrical signal from said silicon-based transducer chip corresponding to said incident sound; and
an intermediate chip fixing said silicon-based transducer chip to said integrated-circuit chip in a spaced relationship, said intermediate chip including an electrical conductor coupling said integrated-circuit chip and said silicon-based transducer chip.

11. The hearing instrument of claim 10, wherein said intermediate chip and said integrated-circuit chip are generally coplanar.

12. The hearing instrument of claim 9, wherein said integrated-circuit chip is flip-chip mounted to said intermediate chip.

13. The hearing instrument of claim 1, wherein said silicon-based transducer assembly includes a plurality of arrayed silicon-based microphones.

14. The hearing instrument of claim 13, wherein said silicon-based microphones are coupled together by a low-power, low-voltage system bus.

15. The hearing instrument of claim 13, wherein said manually movable structure includes a plurality of apertures to permit access of sound to said plurality of silicon-based microphones.

16. The hearing instrument of claim 13, wherein said plurality of silicon-based microphones are adapted to provide adaptive beam steering.

17. The hearing instrument of claim 13, wherein the outputs of said plurality of silicon-based microphones are combined to increase signal-to-noise ratio.

18. The hearing instrument of claim 13, wherein the outputs of said plurality of silicon-based microphones are combined to achieve high-frequency directionality.

19. The hearing instrument of claim 1, wherein said silicon-based transducer assembly includes electronics for processing electrical signals transduced from incident sound.

20. The hearing instrument of claim 19, wherein said electronics include an ASIC.

21. The hearing instrument of claim 19, wherein said electronics include at least one of an analog-to-digital converter, a digital-to-analog converter, a DSP, an amplifier, a preamplifier, a voltage stabilizer, a charge pump, an impedance correction circuit, an oscillator, a filter, and a wireless interface.

22. The hearing instrument of claim 21, wherein said filter is a low-frequency roll-off filter.

23. The hearing instrument of claim 21, wherein said wireless interface includes a transceiver.

24. The hearing instrument of claim 23, wherein said transducer assembly includes a silicon-based receiver.

25. The hearing instrument of claim 21, wherein said wireless interface is an RF link.

26. The hearing instrument of claim 21, wherein said wireless interface is adapted to transfer wireless data between said hearing instrument and a system.

27. The hearing instrument of claim 26, wherein said system is a network.

28. The hearing instrument of claim 26, wherein said system is another hearing instrument.

29. The hearing instrument of claim 26, wherein said wireless data includes modulated audio signals.

30. The hearing instrument of claim 26, wherein said wireless data includes instructions for programming characteristics of said hearing instrument.

31. The hearing instrument of claim 26, wherein said wireless data is transferred through ultrasound.

32. The hearing instrument of claim 30, wherein said characteristics include one of sensitivity, frequency response, gain, and directionality.

33. The hearing instrument of claim 1, wherein said hearing instrument is of a style selected from the group consisting of Completely-in-the-Canal, In-the-Canal, In-the-Ear, and Behind-the-Ear.

34. The hearing instrument of claim 1, wherein said hearing instrument is adapted to be disposable.

35. A hearing instrument, comprising:
a housing;
a faceplate attached to said housing and having an opening;
a silicon-based transducer chip; and
a battery access door disposed adjacent said opening, said battery access door having a custom shape formed by stereolithography to optimize placement of said silicon-based transducer for the wearer of said hearing instrument, said silicon-based transducer chip being secured to said battery access door.

36. The hearing instrument of claim 35, wherein said battery access door includes an aperture to permit access of sound to said silicon-based transducer chip.

37. The hearing instrument of claim 35, wherein said silicon-based transducer chip includes a silicon-based microphone.

38. The hearing instrument of claim 37, wherein said silicon-based transducer chip includes an ASIC.

39. The hearing instrument of claim 37, wherein said silicon-based transducer chip includes a low-frequency roll-off filter.

40. The hearing instrument of claim 35, wherein said silicon-based transducer chip includes a plurality of silicon-based microphones.

41. The hearing instrument of claim 35, wherein said battery access door is hingedly connected to said faceplate.

42. The hearing instrument of claim 35, wherein said battery access door is movable between open and closed positions.

43. The hearing instrument of claim 35, further comprising a protection strip movable with said battery access door and disposed across at least a portion of said battery access door, said protection strip having a grid to permit access of sound to said silicon-based transducer chip.

* * * * *

UNITED STATES PATENT AND TRADEMARK OFFICE
CERTIFICATE OF CORRECTION

| | | |
|---|---|---|
| PATENT NO. | : 7,142,682 B2 | Page 1 of 1 |
| APPLICATION NO. | : 10/326208 | |
| DATED | : November 28, 2006 | |
| INVENTOR(S) | : Matthias Müllenborn et al. | |

It is certified that error appears in the above-identified patent and that said Letters Patent is hereby corrected as shown below:

Column 5, please replace line 3 with the following:
   In a preferred embodiment, the IC chip 26 or the IC chip Signed and Sealed this Thirteenth Day of February, 2007

JON W. DUDAS
*Director of the United States Patent and Trademark Office*